United States Patent
Sharma et al.

(10) Patent No.: US 10,123,372 B2
(45) Date of Patent: Nov. 6, 2018

(54) DEVICE, SYSTEM AND METHOD TO AVOID VOICE CALL SETUP FAILURE DUE TO NETWORK CONGESTION

(71) Applicant: APPLE INC., Cupertino, CA (US)

(72) Inventors: Prateek Sharma, San Jose, CA (US); Sreevalsan Vallath, Dublin, CA (US); Deepankar Bhattacharjee, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/274,038

(22) Filed: Sep. 23, 2016

(65) Prior Publication Data

US 2017/0094565 A1    Mar. 30, 2017

Related U.S. Application Data

(60) Provisional application No. 62/235,077, filed on Sep. 30, 2015.

(51) Int. Cl.
| | |
|---|---|
| *H04L 29/06* | (2006.01) |
| *H04W 76/18* | (2018.01) |
| *H04W 36/22* | (2009.01) |
| *H04W 36/00* | (2009.01) |

(52) U.S. Cl.
CPC ......... *H04W 76/18* (2018.02); *H04L 65/1016* (2013.01); *H04L 65/1069* (2013.01); *H04L 65/1006* (2013.01); *H04W 36/0022* (2013.01); *H04W 36/22* (2013.01)

(58) Field of Classification Search
CPC . H04W 36/0022; H04W 36/22; H04W 84/12; H04W 65/1006
See application file for complete search history.

(56) References Cited

U.S. PATENT DOCUMENTS

| | | | |
|---|---|---|---|
| 9,253,704 B1 * | 2/2016 | Sarkar | H04W 36/30 |
| 9,635,686 B2 * | 4/2017 | Jain | H04W 36/0083 |
| 9,674,674 B2 * | 6/2017 | Wang | H04W 4/06 |
| 9,872,317 B2 * | 1/2018 | Baek | H04W 76/007 |
| 2015/0016380 A1 * | 1/2015 | Tanaka | H04W 76/02 370/329 |
| 2015/0078252 A1 * | 3/2015 | Obata | H04L 65/1073 370/328 |

(Continued)

*Primary Examiner* — Jay P Patel
(74) *Attorney, Agent, or Firm* — Fay Kaplun & Marcin, LLP

(57) ABSTRACT

Devices and methods for handling phone calls. One device is a user equipment (UE) configured to establish a connection with a first evolved Node B (eNB). A method includes transmitting an invite signal to a further UE for a Voice over LTE (VoLTE) call, receiving an accept signal from the further UE, receiving a fail signal from the first eNB that a dedicated bearer is unavailable, generating a trigger signal in response to receiving the fail signal and transmitting the trigger signal to the first eNB. Another device is a base station (e.g., eNB) that receives a VoLTE call request from a UE, determines whether the eNB has sufficient resources to provide a dedicated bearer. When it is determined the eNB has insufficient resources, the eNB determines whether a further eNB has sufficient resources to provide the dedicated bearer, and determines whether the UE can connect to the further eNB.

20 Claims, 10 Drawing Sheets

(56) References Cited

U.S. PATENT DOCUMENTS

| | | | |
|---|---|---|---|
| 2016/0135219 A1* | 5/2016 | Jain | H04W 40/06 370/329 |
| 2016/0135222 A1* | 5/2016 | Jain | H04W 74/04 370/329 |
| 2016/0219644 A1* | 7/2016 | Zhao | H04W 76/022 |
| 2016/0234744 A1* | 8/2016 | Wu | H04W 36/0022 |
| 2017/0019819 A1* | 1/2017 | Yang | H04B 7/1855 |
| 2018/0035345 A1* | 2/2018 | Chockalingam | H04W 36/30 |

\* cited by examiner

DEVICE, SYSTEM AND METHOD TO AVOID VOICE CALL SETUP FAILURE DUE TO NETWORK CONGESTION

PRIORITY CLAIM/INCORPORATION BY REFERENCE

This application claims priority to U.S. Provisional Application 62/235,077 entitled "Device, System and Method for Performing a Call," filed on Sep. 30, 2015, the entirety of which is incorporated herein by reference.

BACKGROUND INFORMATION

A first user equipment (UE) may be configured to communicate wirelessly with a second UE. Specifically, the first UE may transmit data to and receive data from the second UE through a wired or wireless communications network. The first and second UEs may use the network to communicate using a variety of different applications. For example, the first UE may be a mobile originating (MO) UE while the second UE may be a mobile terminating (MT) UE for a voice call. The voice call may be performed in a variety of different manners. For example, when the MO or MT UE is connected to a legacy network, the voice call may be performed using circuit switching. In another example, when the MO or MT UE is connected to an Internet Protocol (IP) data transmission network, the voice call may be performed using Voice over IP (VoIP). More specifically, when the network is a Long Term Evolution (LTE) network, the VoIP call may be a Voice over LTE (VoLTE) call.

When the VoLTE call is performed, the MO and MT UEs may perform a setup procedure. Initially, when the MO and MT UEs connect to the LTE network, each UE may be associated with one or more default bearers with an associated base station of the LTE network to which the UE is connected that provide a best effort service in the exchange of data with the LTE network. Furthermore, when a particular application is being utilized such as the VoLTE call, each UE may be assigned a dedicated bearer with the associated base station that provides a dedicated tunnel for data to be transmitted with regard to the VoLTE call (e.g., the voice data). The dedicated bearer may provide a variety of functionalities such as improving throughput or guaranteeing a bit rate for the data to be transmitted. However, if the base station (e.g., an evolved Node B (eNB) with an LTE network) does not have sufficient resources to provide the dedicated bearer, the VoLTE call fails even when the MT UE has accepted the invite.

SUMMARY

A method performed by a user equipment (UE) configured to establish a connection with a Long Term Evolution (LTE) network, the LTE network including a first evolved Node B (eNB) and a second eNB, the UE being associated with the first eNB. The method includes transmitting an invite signal to a further UE for a Voice over LTE (VoLTE) call, receiving an accept signal from the further UE for the VoLTE call, receiving a fail signal from the first eNB that a dedicated bearer is unavailable, generating a trigger signal in response to receiving the fail signal and transmitting the trigger signal to the first eNB.

A user equipment (UE) having a transceiver configured to establish a connection with a Long Term Evolution (LTE) network, the LTE network including a first evolved Node B (eNB) and a second eNB, the UE being associated with the first eNB; and a processor configured to perform operations. The operations include generating an invite signal to be transmitted to a further UE for a Voice over LTE (VoLTE) call, receiving an accept signal from the further UE for the VoLTE call, receiving a fail signal from the first eNB that a dedicated bearer is unavailable and generating a trigger signal in response to receiving the fail signal.

A method performed by an evolved Node B (eNB) of a Long Term Evolution (LTE) network. The method including receiving a Voice over LTE (VoLTE) call request from a user, equipment (UE) to place a VoLTE call to a further UE, determining whether the eNB has sufficient resources to provide a dedicated bearer to the UE for the VoLTE call, when it is determined the eNB has insufficient resources to provide the dedicated bearer, determining whether a further eNB of the LTE network has sufficient resources to provide the dedicated bearer for the UE and determining whether the UE is capable of connecting to the further eNB and when the further eNB has sufficient resources and the UE is capable of connecting to the eNB, performing a handover procedure such that the UE is associated with the further eNB.

DETAILED DESCRIPTION

Figure 1:
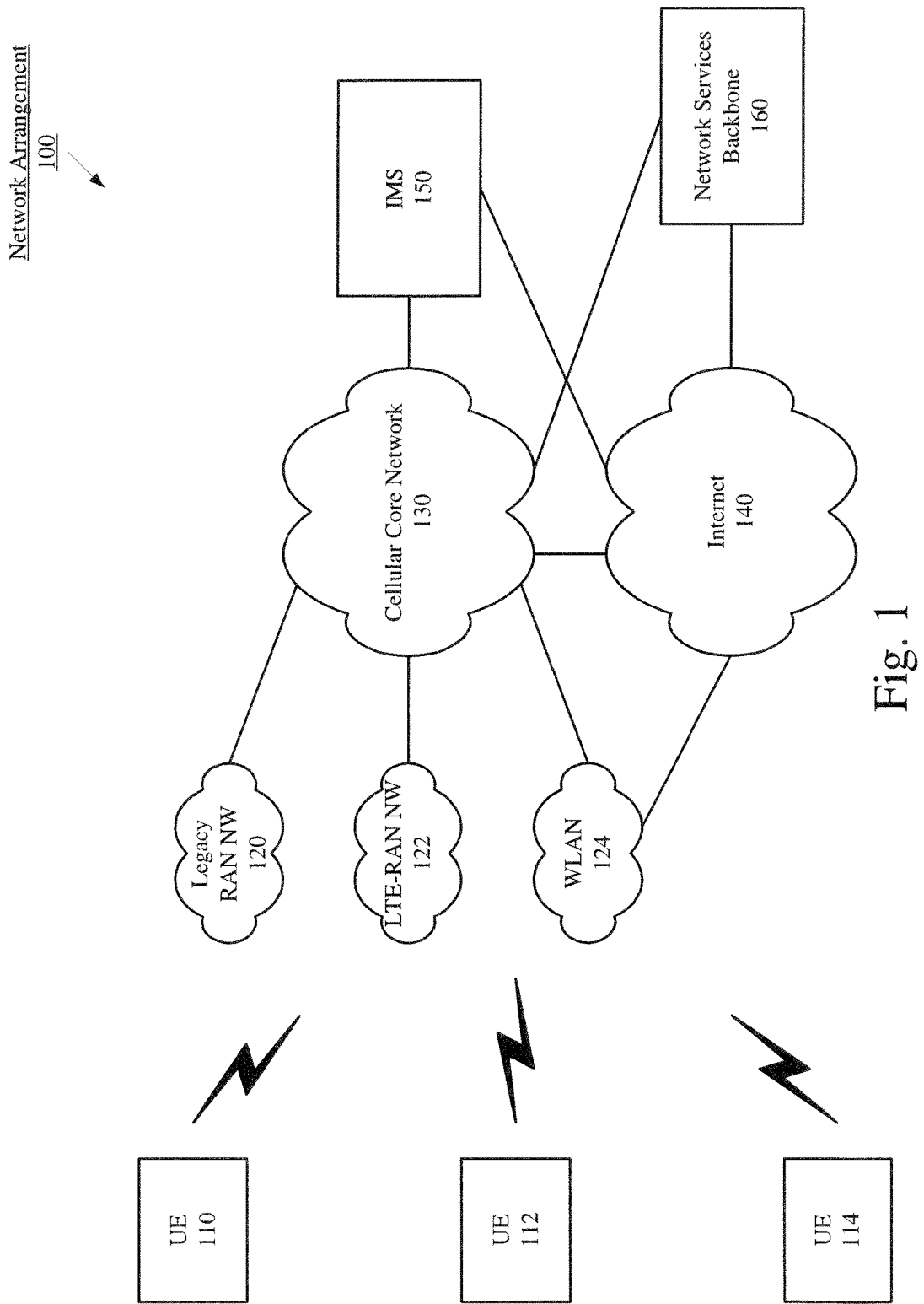
FIG. 1 shows a network arrangement according to various embodiments described herein.

The exemplary embodiments may be further understood with reference to the following description and the related appended drawings, wherein like elements are provided with the same reference numerals. The exemplary embodiments are related to a device, system, and method for performing a call. Specifically, the call may be a Voice over Long Term Evolution (LTE) (VoLTE) call where a dedicated bearer is established to perform the VoLTE call when resources are available on a base station to which a mobile originating (MO) user equipment (UE) is connected. The exemplary embodiments provide a first mechanism in which a network operation is used in performing the call, a second mechanism in which a first UE operation is used in performing the call, and a third mechanism in which a second UE operation is used in performing the call.

Initially, it is noted that the exemplary embodiments are described with regard to a VoLTE call. However, the VoLTE call is only exemplary. In some exemplary embodiments, the VoLTE call may be a component of the communication performed by the MO UE. For example, the VoLTE call may be a component of a video over LTE functionality. Thus, any use of a VoLTE call or a voice call may be representative of other communication calls including a video call. It is also noted that since the exemplary embodiments relate a VoLTE call, the exemplary embodiments are described with regard to resources and whether a dedicated bearer is capable of being established. However, this is also only exemplary. The dedicated bearer may be an operation utilized in a call operation for the call to be performed properly in an LTE network and may represent any comparable step in other packet switched networks.

FIG. 1 shows a network arrangement 100 according to various embodiments described herein. The exemplary network arrangement 100 includes UEs 110-114. In this example, it is assumed that a respective, different user is using each of the UEs 100-114. For example, a first user may be utilizing the UE 110, a second user may be utilizing the UE 112, and a third user may be utilizing the UE 114. Those skilled in the art will understand that the UEs 110-114 may be any type of electronic component that is configured to communicate via a network, e.g., mobile phones, tablet computers, desktop computers, smartphones, phablets, embedded devices, wearables, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes. However, as will be understood from the description herein, the exemplary embodiments may relate to when at least two UEs 110-114 are present in the network arrangement 100 for a call to be performed.

Each of the UEs 110-114 may be configured to communicate with one or more networks. In this example, the networks with which the UEs 110-114 may communicate are a legacy radio access network (RAN) 120, a LTE RAN (LTE-RAN) 122, and a wireless local area network (WLAN) 124. In this example, each of the networks 120-124 is a wireless network with which the UEs 110-114 may communicate wirelessly. However, it should be understood that the UEs 110-114 may also communicate with other types of networks using a wired connection. With regards to the exemplary embodiments, the UEs 110-114 may establish a connection with the LTE-RAN 122 to perform VoLTE calls with other UEs. For example, the UEs 110-114 may have a LTE chipset to communicate with the LTE-RAN 122. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base stations (Node Bs, eNodeBs, HeNBs, etc.) that are configured to send and receive traffic from UEs that are equipped with the appropriate cellular chip set. Examples of the legacy RAN 120 may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the UEs 110-114 to communicate with the WLAN 124. However, as noted above, the exemplary embodiments relate to the UEs 110-114 utilizing the LTE-RAN 122 to perform VoLTE calls.

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the UEs 110-114 using the IP protocol. The IMS 150 may include a variety of components to accomplish this task. For example, a typical IMS 150 includes a Home Subscriber Server (HSS) that stores subscription information for a user of the UEs 110-114. Thus, when the corresponding UE of the user registers with the IMS 150 (e.g., connects thereto), the subscription information may be utilized to determine various features. For example, this subscription information is used to provide the correct multimedia services to the user such as a VoLTE call. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party.

Thus, the network arrangement 100 allows the UEs 110-114 to perform functionalities generally associated with computers and cellular networks. For example, the UEs 110-114 may perform the VoLTE calls to other parties, may browse the Internet 140 for information, may stream multimedia data to the UEs 110-114, etc.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network services backbone 160 may be provided by any entity or a set of entities. In one example, the network services backbone 160 is provided by the supplier of one or more of the UEs 110-114. In another example, the network services backbone 160 is provided by the cellular network provider. In still a further example, the network services backbone 160 is provided by a third party unrelated to the cellular network provider or the supplier of the UEs 110-114.

The exemplary embodiments relate to the UEs 110-114 performing a VoLTE call. For example, the UE 110 may be the MO UE that invites a further UE such as the UE 112, which may be a mobile terminating (MT) UE. Initially, the UEs 110-114 establish a connection to the LTE-RAN 122. Those skilled in the art will understand that any association procedure may be performed for the UEs 110-114 to connect to the LTE-RAN 122. For example, as discussed above, the LTE-RAN 122 may be associated with a particular cellular provider where the UE 110-114 and/or the user thereof has a contract and credential information (e.g., stored on a SIM card). Upon detecting the presence of the LTE-RAN 122, the UEs 110-114 may transmit the corresponding credential information to associate with the LTE-RAN 122. More specifically, the UEs 110-114 may associate with a specific base station (e.g., an eNB of the LTE-RAN 122).

Figure 2:
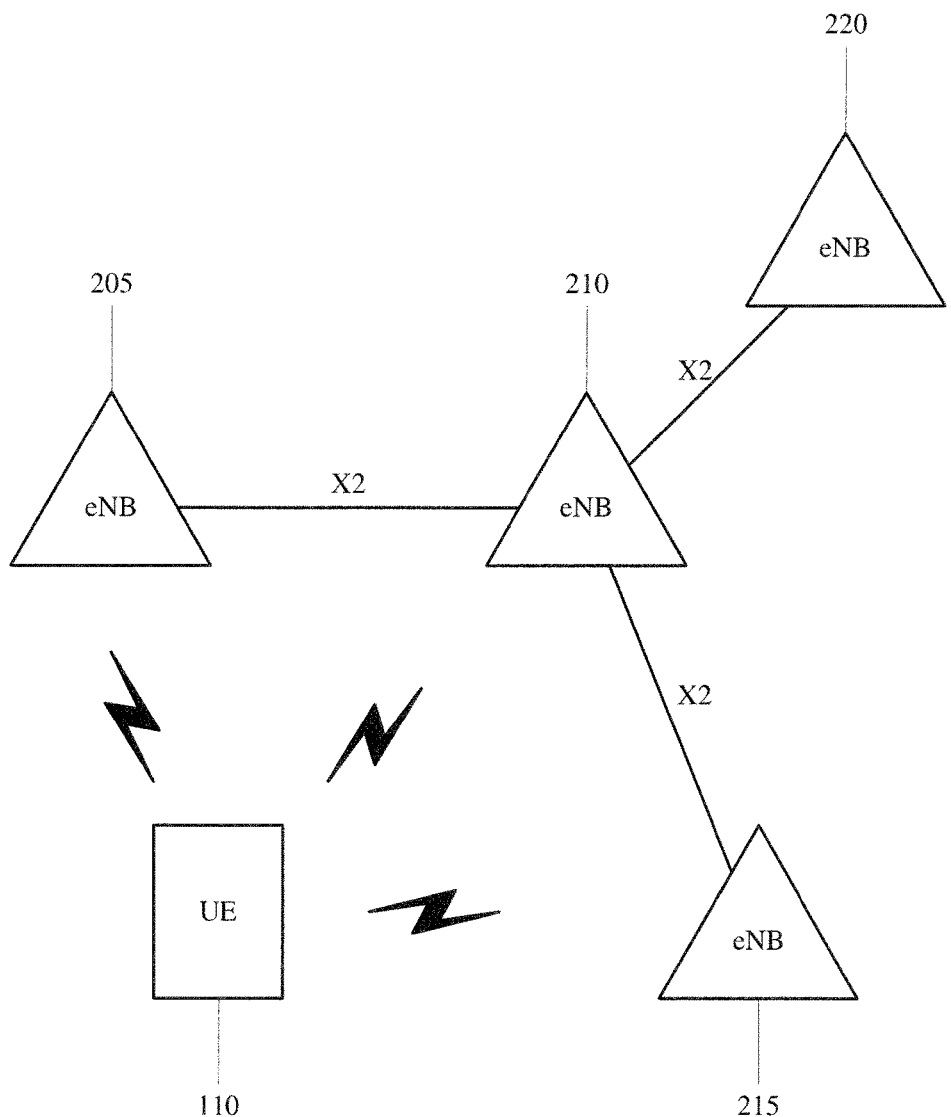
FIG. 2 shows a Long Term Evolution network according to various embodiments described herein.

FIG. 2 shows the LTE-RAN 122 according to various embodiments described herein. As discussed above, the LTE-RAN 122 may include a plurality of base stations. As illustrated, the LTE-RAN 122 may include a plurality of eNBs 205-220. It should be noted that the LTE-RAN 122 including four eNBs is only exemplary and that the LTE-RAN 122 may include any number of eNBs that provide an access point for UEs to establish a connection to the LTE-RAN 122. The eNBs 205-220 may utilize a communication protocol such as the X2-AP protocol on an X2 interface such that one of the eNBs 205-220 may communicate with the other eNBs 205-220. Accordingly, information such as load information or available resource information of a first eNB may be provided when requested by a second eNB. Typically, the X2 interface is a wired interface between the different eNBs 205-220. In the example of FIG. 2, a wired X2 interface is depicted between the eNB 210 and each of the other eNBs 205, 215 and 220. However, it is also possible that there are wired X2 interfaces between the other eNBs (e.g., an X2 interface between eNB 205 and eNB 220 that is not shown). It is also possible that the eNBs 205-220 may exchange information via a wireless connection.

Also illustrated in the LTE-RAN 122 of FIG. 2, the UE 110 may be configured to directly exchange data with select ones of the LTE-RAN 122. For example, the UE 110 may have established a connection to the LTE-RAN 122 via the eNB 205 in which an association procedure has been performed. However, the LTE-RAN 122 may have the eNBs 210, 215 disposed such that the location of the UE 110 relative to the eNBs 210, 215 enables data to be exchanged (e.g., signal power information such as a received signal strength indicator (RSSI)). Thus, the UE 110 may be associated with the eNB 205 and be using the eNB 205 to exchange data with the LTE-RAN 122. However, the UE 110 may also discover the eNBs 210, 215 and be able to measure characteristics of the signals being transmitted by the eNBs 210 and 215. The eNB 220 may also be a base station of the LTE-RAN 122 but may be positioned in such a way that the UE 110 is currently incapable of exchanging data with the eNB 220. For example, the UE 110 may be located outside an operating area of the eNB 220, may have interference (e.g., physical structure) that prevents the UE 110 from communicating with the eNB 220, etc.

When the UEs 110-114 associate and establish a connection with the LTE-RAN 122 such as the UE 110 associating with the eNB 205, one or more default bearers may be established for the UEs 110-114. Initially, a bearer may define how data is treated when transmitted through the network. That is, the bearer may be a set of network parameters that define data specific treatment by type or association with an application. Accordingly, the LTE-RAN 122 may treat a first type of data in a first way and treat a second type of data in a second way. For example, the first type of data may be prioritized so that the LTE-RAN 122 treats this data in a special manner. It should be noted that the bearer may also define the treatment based upon user identity or other identification parameters.

One type of bearer that is established when initially connecting to the LTE-RAN 122 is a default bearer. The LTE-RAN 122 via the associated eNB may assign the default bearer, which remains so long as the UE is connected to the LTE-RAN 122. The default bearer may be a best effort service for the data transmitted through the LTE-RAN 122. Thus, depending upon various network conditions currently being experienced by the LTE-RAN 122, the data being transmitted through the default bearer may be given whatever resources are available. The default bearer may be associated with a particular IP address and a single UE may have further default bearers established. Each default bearer may be assigned a quality of service (QoS) class indicator (QCI) of 5 to 9 that relates to non-guaranteed bit rate (GBR) bearers. Applications that may utilize the default bearer may be those in which the delivery of data is less time sensitive. For example, signaling messages such as Session Initiation Protocol (SIP) may utilize the default bearer. Other examples include smartphone traffic including video, chat, email, browsing, etc.

A further type of bearer that may be established between the UE and the LTE-RAN 122 is a dedicated bearer. The dedicated bearer may provide a dedicated tunnel to specific traffic. One application that utilizes the dedicated tunnel is VoLTE voice data used when performing the VoLTE call. The dedicated bearer may be an additional bearer over the default bearer that is established at a time subsequent to the default bearer being established (e.g., upon performing the VoLTE call). Since default bearers require separate IP addresses and the dedicated bearer is provided over an established default bearer, the dedicated bearer does not require a separate IP address. However, the dedicated bearer is linked to the default bearer established previously. Specifically, a value defined during setup of the dedicated bearer may be used to link the dedicated bearer to the default bearer. The dedicated bearer may utilize the same QCI as the default bearer but may also utilize a different QCI that relates to a GBR bearer. The dedicated bearer may use traffic flow templates (TFT) to provide the special treatment to specific services such as the VoLTE call. That is, the TFT may also define the rules of when the dedicated bearer is to be used based upon the application being executed.

When considering the operation of the default bearer and the dedicated bearer, the default bearer is established upon the UE connecting to the LTE-RAN 122. Specifically, the LTE-RAN 122 assigns the default bearer to the UE. Subsequently, while still connected to the LTE-RAN 122, the UE may execute the VoLTE call functionality. For example, the UE 110 may be the MO UE while the UE 112 may be the MT UE. As such, the MT UE may also be connected to the LTE-RAN 122 and have a default bearer assigned and established. When the VoLTE call functionality is performed, various signaling messages are transmitted between the UE 110 and the UE 112 via the LTE-RAN 122 and the IMS 150 through the respective default bearer. That is, a VoLTE call setup procedure may be performed. For example, a SIP Invite signal may be transmitted from the MO UE to the MT UE through the LTE-RAN 122. When the SIP Invite reaches the MT UE, the MO UE and the MT UE may enter a ringing state as to whether the VoLTE call is to be established. If the MT UE accepts the VoLTE call, a SIP 200 OK signal may be transmitted back to the MO UE that indicates that the VoLTE call is to be established. Once the VoLTE call has been established from successfully transmitting the different signaling messages, the UE 110 and the UE 112 may be connected to each other to perform the VoLTE call. Specifically, the dedicated bearer may be established for each of the UE 110 and the UE 112 for the VoLTE data to be transmitted. However, the eNB 205 to which the MO UE 110 is associated must have sufficient resources to provide the dedicated bearer to be used for the VoLTE call that is to be established (e.g., from the SIP 200 OK signal being transmitted). If the eNB 205 has insufficient resources, a conventional approach entails the eNB 205 transmitting another SIP signal (i.e., SIP 503—Insufficient Bearer Resources) indicative of this. Those skilled in the art will understand that the eNB 205 is transparent to the SIP signaling and the dedicated bearer creation process initiates only after the MT UE has picked up the VoLTE call or upon transmitting the SIP 200 OK signal. Therefore, the conventional approach when the VoLTE call is to be established and the eNB 205 has insufficient resources (e.g., the eNB 205 is congested) results in the VoLTE call failing.

It is noted that the VoLTE call setup procedure may include a variety of other processes. For purposes of the description herein, it may be assumed that these processes are performed properly and successfully. For example, the UE 110 initially establishes a connection to the IMS 150. It should be noted that this operation of the setup procedure may be a more general operation that is performed at various other times and not necessarily be performed due to the VoLTE call being performed. For example, the connection to the IMS 150 may occur whenever the UE 110 has established a connection to the LTE-RAN 122. However, it is also noted that in order to utilize the VoLTE call functionality, a connection to the IMS 150 may be required.

The connection to the IMS 150 may be performed through an initial association with the eNB of the LTE-RAN 122. A subsequent connection may be established to the IMS 150 through various components of the IMS 150. Specifically, an attach procedure may be performed in connecting the UE 110 to the IMS 150. For example, the IMS 150 may include a mobility management entity (MME) and a packet data network (PDN) gateway (PGW). These components may be responsible for at least one operation when the VoLTE call functionality is used. Specifically, the MME may be a control-node for the LTE-RAN 122 that performs paging and tagging operations for an idle mode of the UE 110. More specifically, the MME may perform operations related to bearer activation and/or deactivation. The MME may also select a serving gateway (SGW) at the initial attach with the IMS 150. The SGW may be configured to route and forward data packets for the UE 110. For example, the SGW may manage and store contexts for the UE 110 such as parameters of the bearer service, network internal routing information, etc. The MME may also authenticate the UE 110 (via the HSS) such that the services available to the UE 110 are identified including the VoLTE call functionality. The PGW may be configured to provide a connectivity between the UE 110 to an external PDN by being a point of entry/exit for data packet traffic for the UE 110. It is noted that the IMS 150 may provide a connection to a plurality of PGW to access a corresponding number of PDN. Thus, the UE 110 may be enabled to exchange data packets with multiple PDNs via the PGW of the IMS 150. During the attach procedure, the UE 110 may attach when a default access point name (APN) is an IMS APN and the IMS PDN is established during the default bearer determination. However, if the default APN is not the IMS APN, the IMD PDN may be established following the attach procedure.

Once the attach procedure is performed and the UE 110 has established a connection to the IMS 150, an IMS registration procedure may be performed. The IMS registration procedure may enable the identified multimedia services to be accessed. Specifically, the IMS registration procedure may entail registering at least one IP Multimedia Public Identity (IMPU) such as a telephone number of the UE 110. The IMS 150 may then authenticate an IP Multimedia Private Identity (IMPI). The registration process may be initiated by the UE 110 transmitting a SIP registration message to a proxy call session control function (CSCF) (P-CSCF). Using further message passing operations such as through an interrogating CSCF (I-CSCF) and a serving CSCF (S-CSCF), an authentication procedure may be performed via the HSS. With specific regard to the VoLTE call functionality, the IMS registration procedure may incorporate the P-CSCF and a policy and charging rules function (PCRF). The P-CSCF may be a SIP proxy providing a first point of contact for the UE 110 with the IMS 150. The P-CSCF may also be disposed on a path of all signaling to inspect each signal ensuring that the UE 110 does not misbehave such as changing a known signaling route or disobeying a routing policy. The PCRF may determine policy rules in the IMS 150. The PCRF aggregates information to and from the IMS 150 to support creation of the rules and make policy decisions for the multimedia services performed by the UE 110. With particular regard to the VoLTE call functionality, the PCRF may be a mediator of network resources for the IMS 150 to establish the call and allocate the requested bandwidth to the dedicated bearer.

With the UE 110 having been attached to and registered with the IMS 150, the user of the UE 110 may opt to perform the VoLTE call functionality. Thus, the VoLTE call setup procedure may receive the input from the user in performing this operation. For example, the user may launch a VoLTE call application and provide/select an identity of the MT UE 112. To perform the VoLTE call, the UE 110 may transmit a SIP invite to the UE 112 via the P-CSCF which results in the further SIP signaling that may occur as described above.

The exemplary embodiments provide a way to perform the VoLTE call between the UE 110 and the UE 112 where various mechanisms are used in aiding the MO UE 110 to communicate with the MT UE 110. Initially, the exemplary embodiments may attempt to utilize the VoLTE call for the communication to be performed but may also utilize a failover option such as a single radio voice call continuity (SRVCC) to ensure that a call is still established such as through a circuit switched connectivity (e.g., Wideband Code Division Multiple Access (WCDMA)).

Figure 3:
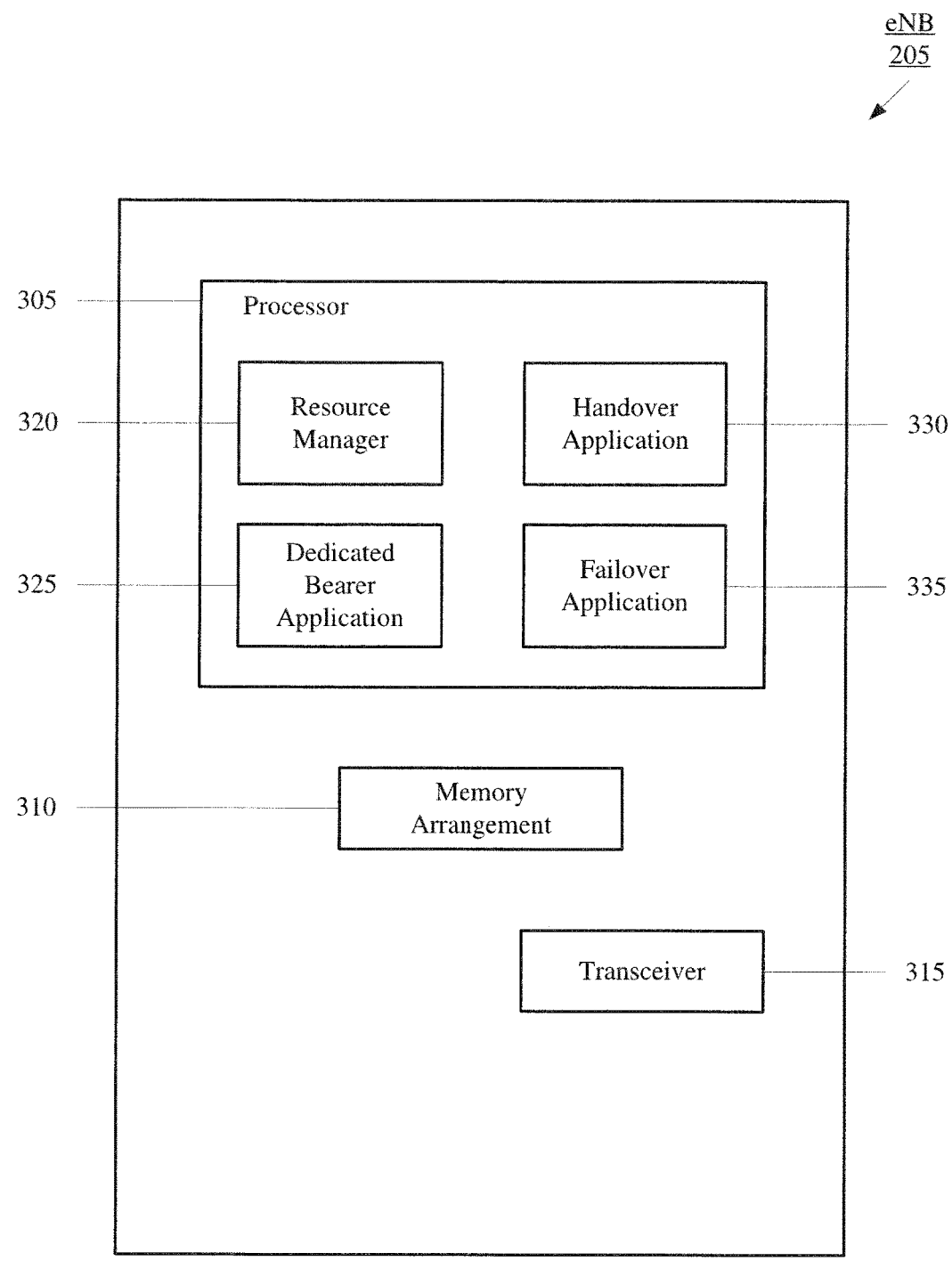
FIG. 3 shows an evolved Node B of the LTE network of FIG. 2 according to various embodiments described herein.

According to a first mechanism, a network operation may be used in aiding the MO UE 110 to communicate with the MT UE 110. Specifically, the eNB 205 may perform operations that provide this feature. FIG. 3 shows the eNB 205 of the LTE-RAN 122 of FIG. 2 according to various embodiments described herein. As discussed above, the eNB 205 may be a base station of the LTE-RAN 122 that enables the UE 110 to associate with the eNB 205 to establish a connection to the LTE-RAN 122. Although the description herein relates specifically to the eNB 205, it is noted that the neighboring eNBs 210-220 may also include the components and perform the operations described herein. Thus, the eNB 205 may represent all of the eNBs 205-220. The eNB 205 may include a processor 305, a memory arrangement 310, and a transceiver 315.

The processor 305 may be configured to execute a resource manager 320, a dedicated bearer application 325, a handover application 330, and a failover application 335. The resource manager 320 may be configured to manage the resources of the eNB 205 (e.g., capacity, parallel processes, bandwidth management, etc.). The resource manager 320 may also determine the available resources and how these available resources are to be used. Specifically, the resource manager 320 may determine whether there are sufficient resources for a dedicated bearer to be established for the MO UE 110. The dedicated bearer application 325 may be configured to establish the dedicated bearer with the MO UE 110 when an indication is provided by the resource manager 320 of the required resources to perform this functionality.

The network operation according to the exemplary embodiments may initially determine whether the VoLTE call may still be established despite the dedicated bearer failing to be established by the eNB 205. However, as discussed above, the dedicated bearer is required for the VoLTE call to be performed. Thus, the eNB 205 may utilize the handover application 330. The handover application 330 may be configured to determine whether a neighboring one of the eNBs 210-220 may be used to provide the dedicated bearer for the VoLTE call performed by the UE 110 which is currently associated with the eNB 205. Accordingly, upon receiving an indication from the resource manager 320 that there are not sufficient resources for the eNB 205 to provide the dedicated bearer for the VoLTE call, the eNB 205 via the handover application 330 may proactively assess a load of the neighbor eNBs 210-220 and determine whether the eNBs 210-220 are congested or have available resources to establish the dedicated bearer for the UE 110. For example, the load information may be received through the X2-AP protocol over the X2 interface. If the handover application 330 determines that one of the neighboring eNBs 210-220 has sufficient resources, the handover application 330 may determine whether the UE 110 is capable of exchanging data with the neighboring eNB (e.g., further information over the X2 interface). For example, the eNB 220 may indicate that data is not currently being exchanged (e.g., through a discovery process). Thus, even if the eNB 220 were to have the available resources, the eNB 220 may be removed from consideration. In another example, the eNB 210 may indicate that data is being exchanged. Thus, if the eNB 210 were to have the available resources, the eNB 210 may be considered. The handover application 330 may provide an indication to the LTE-RAN 122, which triggers a handover operation from the eNB 205 to the eNB 210. Accordingly, the resource manager 320 may not utilize a conventional mechanism of transmitting the SIP 503 indicating the bearer setup failure and have the VoLTE call failed. Instead, the VoLTE call may be saved and the dedicated bearer may be established with the eNB 210. It is noted that the handover operation may also prepare the target handover eNB by providing the necessary data to continue the operation in establishing the VoLTE call.

It is possible for the handover application 330 to receive the indication from the resource manager 320 and also determine that the neighboring eNBs 210-220 do not have the required resources to provide the dedicated bearer for the VoLTE call of the UE 110. In a first manner of handling this type of scenario, the eNB 205 may utilize the SIP 503 that results in the call failure. However, in a second manner of handling this type of scenario and according to the exemplary embodiments, the eNB 205 may utilize the failover application 335 to provide yet another mechanism of saving the call. Specifically, the failover application 335 may continue upon a basis that the dedicated bearer failed to be established through congestion at the eNB 205 as well as the neighboring eNBs 210-220. Accordingly, the failover application 335 may trigger a SRVCC operation in a substantially aggressive way so that the call may be completed over a circuit switched connectivity. The failover application 335 may assume that the UE 110 has a capability of performing the call over the circuit switched connectivity. However, the failover application 335 may also perform further operations such as requesting circuit switched measurements (e.g., WCDMA) from the UE 110 to verify the capability. If the UE 110 has the circuit switched capability, then the SRVCC operation may be used. However, if the UE 110 does not have the circuit switched capability, the eNB 205 may continue with the SIP 503.

Figure 4:
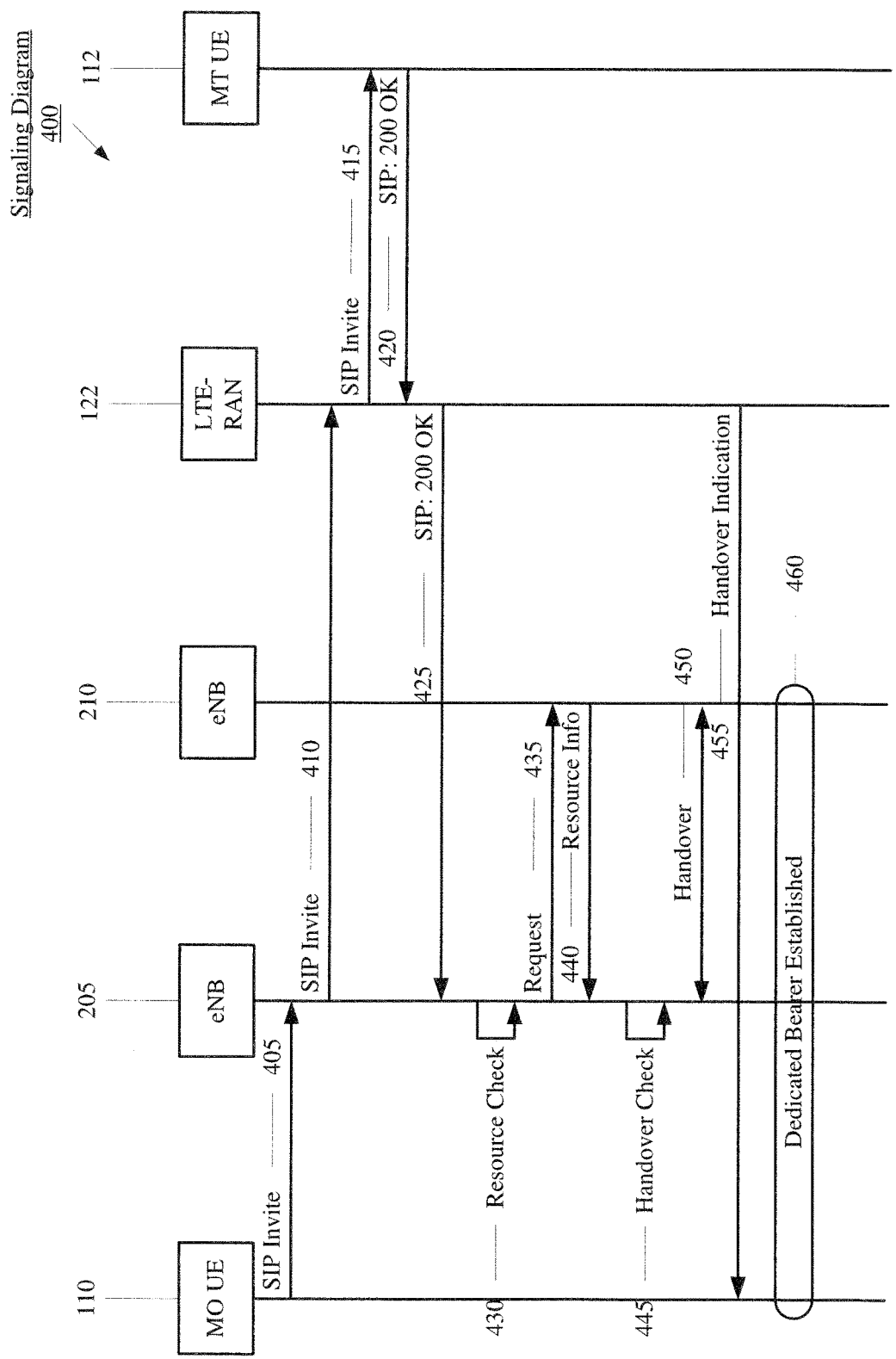
FIG. 4 shows a signaling diagram for a network operation in performing a call according to various embodiments described herein.

FIG. 4 shows a signaling diagram 400 for a network operation in performing a call according to various embodiments described herein. The signaling diagram 400 illustrates an exemplary process in which the handover application 330 is being used. Thus, the signaling diagram 400 may begin with a conventional process in performing a VoLTE call. The signaling diagram 400 may assume that the UE 110 is the MO UE while the UE 112 is the MT UE, the MO UE 110 is currently connected to the eNB 205, and the eNB 210 is a neighboring eNB to the eNB 205 and capable of communicating with the MO UE 110.

In performing the setup for the VoLTE call, the MO UE 110 may transmit a SIP invite 405 to the eNB 205. The eNB 205 may forward the SIP invite 410 to the LTE-RAN 122. The LTE-RAN 122 may forward the SIP invite 415 to the target destination of the MT UE 112. The MT UE 112 may respond and accept the invite for the VoLTE call. Accordingly, the MT UE 112 may transmit a SIP 200 OK signal 420 back to the LTE-RAN 122. The LTE-RAN 122 may forward the SIP 200 OK 425 to the eNB 205.

When the eNB 205 receives the SIP 200 OK 425, the eNB 205 via the resource manager 320 may perform a resource check 430. The resource check 430 may determine whether the eNB 205 has sufficient resources. If the eNB 205 determines that there are insufficient resources (e.g., the eNB 205 cannot allocate a dedicated bearer to the UE 110), the eNB 205 requests load information 435 from the neighboring eNBs 210-220 such as the eNB 210. The eNB 210 may transmit the resource information 440 to the eNB 205 indicating the load and available resources. The eNB 205 may perform a handover check 445 to determine whether the UE 110 is capable of communicating with the eNB 210. When the eNB 210 is determined to have the available resources (and is capable of communicating with the UE 110), a handover operation 450 may be performed where an association and connection procedure is performed such that the UE 110 is connected to the eNB 210. The LTE-RAN 122 may transmit a handover indication 455 for the UE 110 to update its connectivity parameters. With the handover is being performed, the dedicated bearer may be established 460 between the eNB 210 and the UE 110 and the VoLTE call may be performed. Thus, even though the original eNB 205 did not have a dedicated bearer to handle the VoLTE call, the call did not fail because it was saved by the handover to the eNB 210. Thus, the user experience of a VoLTE call is enhanced because a call failure has been avoided.

It should be noted that in this signaling diagram and the other signaling diagrams illustrated and described herein, there may be additional network components through which the signals flow and/or are processed. An example of an additional network component may be a telephony application server (TAS). The TAS may be generally described as an entity in a telephone network such as that utilized by providers of the cellular core network that performs functionalities unrelated (or tangential) to the routing of messages through the telephone network. For example, the TAS may perform functionalities associated with voice mail features, toll-free numbers, call forwarding features, bridges, etc.

Figure 5:
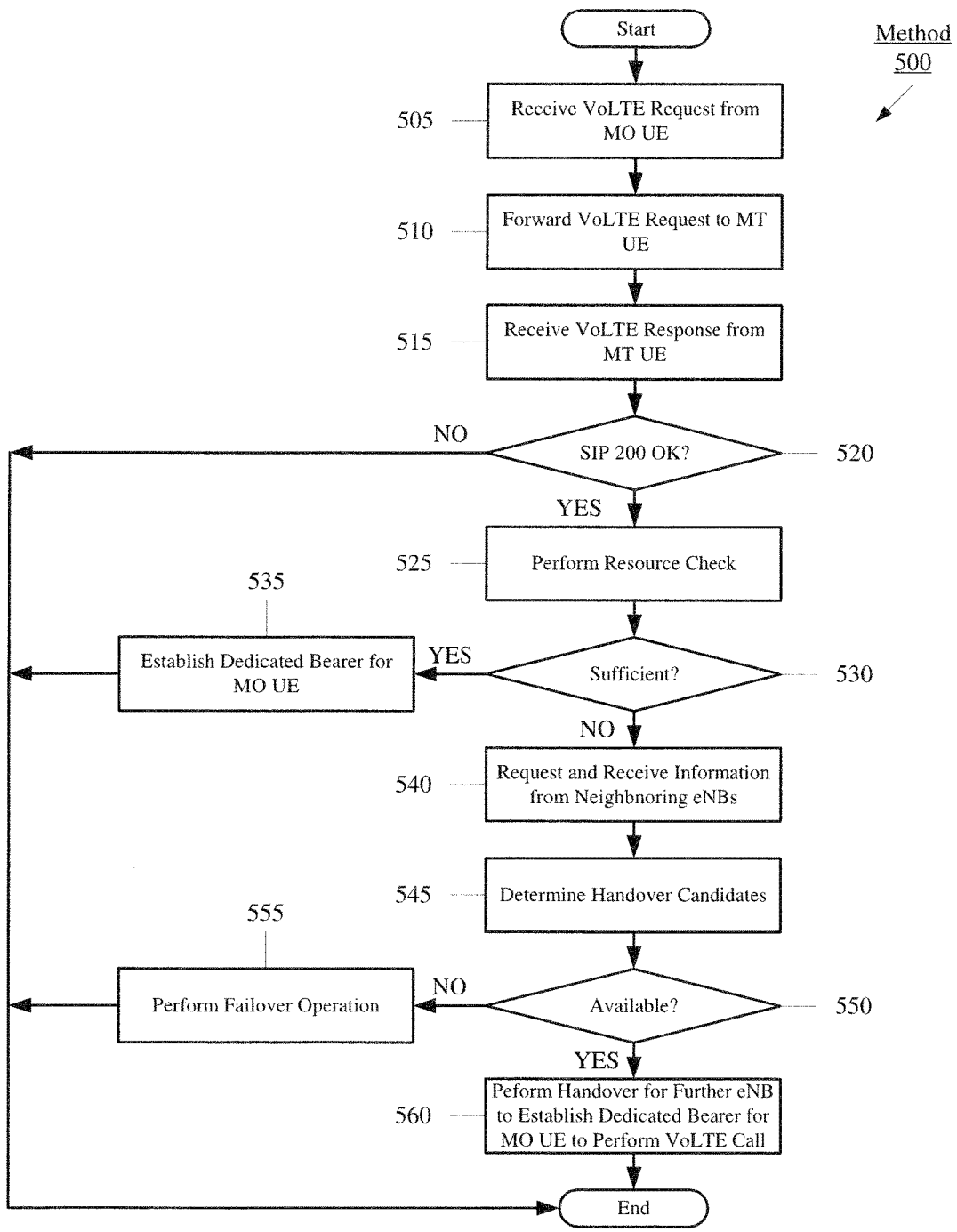
FIG. 5 shows a method for a network operation in performing a call according to various embodiments described herein.

FIG. 5 shows a method 500 for a network operation in performing a call according to various embodiments described herein. The method 500 relates to the first mechanism according to the exemplary embodiments of a network operation aiding the call to be performed initially as a VoLTE call and, if necessary, as a circuit switched call. The method 500 will be described with reference to the eNB 205. The method 500 will also be described with regard to the network arrangement 100 of FIG. 1, the LTE-RAN 122 of FIG. 2, and the eNB 205 of FIG. 3.

In 505, the eNB 205 receives a VoLTE request from the MO UE 110. It is noted that the VoLTE request may also relate to when the UE 110 is the MT UE where the dedicated bearer is still established. However, for illustrative purposes, the UE 110 is represented as the MO UE. The VoLTE request may include the target destination. Thus, in 510, the VoLTE request may be forwarded to the MT UE (e.g., through the eNB 205, to a PGW, to a MME, to an eNB to which the MT UE 112 is associated, and to the MT UE 112). In 515, the eNB 205 may receive the VoLTE response from the MT UE. Specifically, the VoLTE response may be a SIP 200 OK indicating that the user of the MT UE 112 has accepted the invite. The VoLTE response may also correspond to a reject indication. It is noted that the SIP 200 OK may also be forwarded to the MO UE 110.

In 520, the eNB 205 determines whether the VoLTE response is a SIP 200 OK signal. If the eNB 205 determines that the invite is rejected, the eNB 205 may end the method 500. However, if the eNB 205 determines that the SIP 200 OK is received, the eNB 205 continues the method 500 to 525. In 525, the eNB 205 performs a resource check such as with the resource manager 320. In 530, the eNB 205 determines if there are sufficient resources to establish the dedicated bearer for the MO UE 110. If there are sufficient resources, the eNB 205 continues the method 500 to 535 where the eNB 205 establishes the dedicated bearer for the MO UE 110 for the VoLTE call to be performed. However, if there are insufficient resources, the eNB 205 continues the method 500 to 540.

In 540, the eNB 205 requests information from the neighboring eNBs 210-220 such as the load information. The eNB 205 may transmit the request via the X2-AP protocol. The eNB 205 may subsequently receive the information. In 545, the eNB 205 may determine a handover candidate via the handover application 330. The handover candidate may be based on whether the neighboring eNB has sufficient resources and is capable of communicating with the UE 110. For example, the eNBs 210, 215 may be candidates at least for their capability of communicating with the UE 110, whereas the eNB 220 is removed from consideration. Thus, in 550, the eNB 205 determines whether there are any available handover candidates.

If the eNB 205 determines that there are no handover candidates, the eNB 205 continues the method 500 to 555 where the eNB 205 utilizes a failover operation such as a SRVCC in which a circuit switched connectivity is used in performing a circuit switched call. It should be noted that the method 500 may include further operations in which the eNB 205 requests circuit switched capability information to determine whether the SRVCC is to be used. If the eNB 205 determines that there is a handover candidate, the eNB 205 continues the method 500 to 560. In 560, the eNB 205 performs a handover operation with a selected neighboring eNB. When the handover is performed, the selected neighboring eNB may be used in establishing the dedicated bearer for the MO UE to perform the VoLTE call.

As discussed above, the exemplary embodiments provide a way to perform the VoLTE call between the UE 110 and the UE 112 where various mechanisms are used in aiding the MO UE 110 to communicate with the MT UE 110. The above description of the first mechanism relates to a network operation. According to a second mechanism, a UE operation may be used in establishing a call by the MO UE 110 to communicate with the MT UE 112.

According to the second mechanism, the MO UE 110 may prepare the connection with the LTE-RAN 122 for a subsequent attempt in performing the VoLTE call to be performed with a higher probability of success. The MO UE 110 may prepare the connection using a first UE operation or a second UE operation. The MO UE 110 may perform a set of operations corresponding to the first UE operation or the second UE operation upon a trigger being received where the trigger is a SIP signaling sequence. Specifically, the MO UE 110 may receive a first indication of the invite for the VoLTE call being accepted to be followed by a second indication that the VoLTE call fails due to unavailable resources on the eNB 205.

Figure 6:
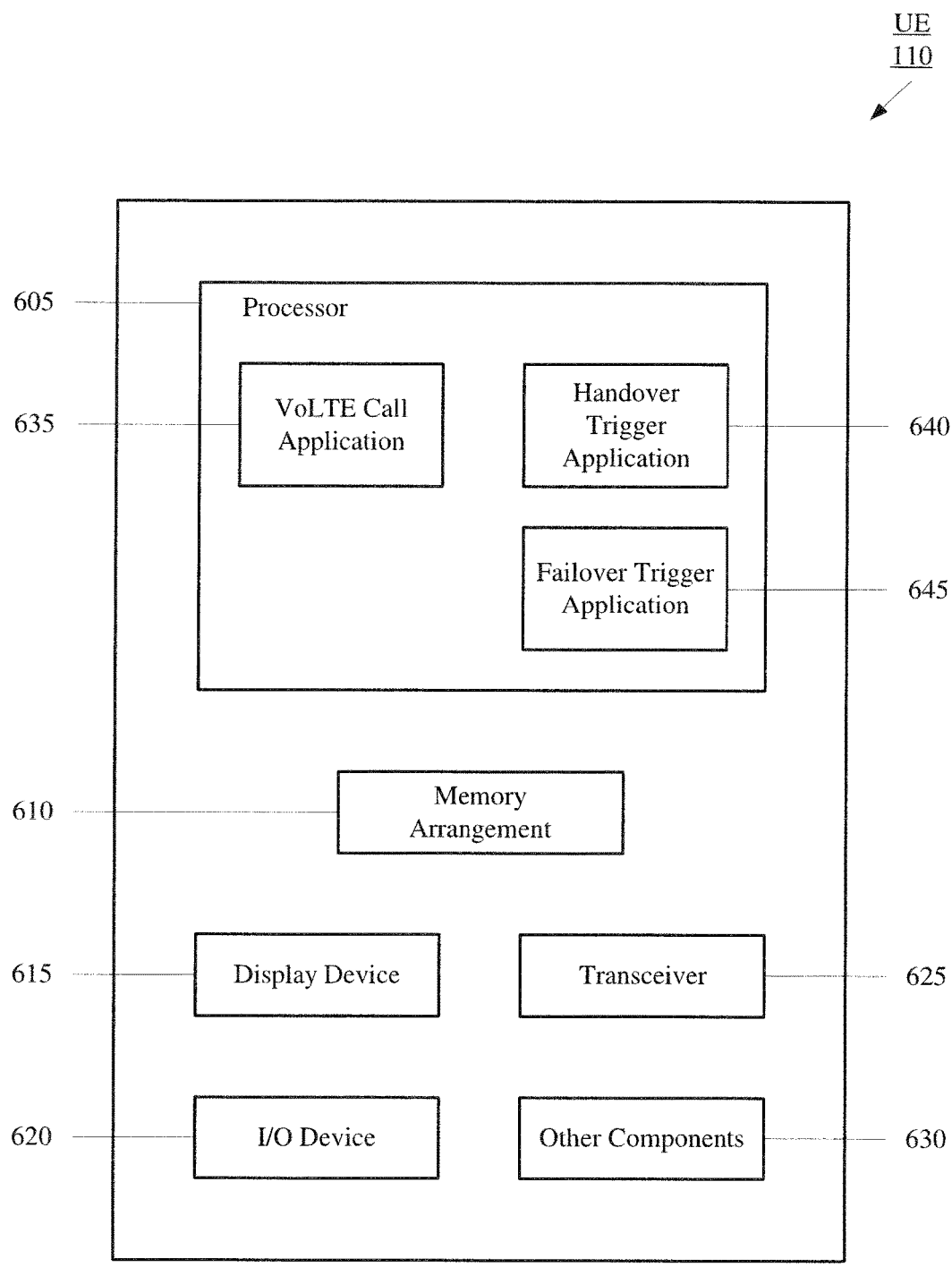
FIG. 6 shows a user equipment according to various embodiments described herein.

FIG. 6 shows the UE 110 according to various embodiments described herein. The UE 110 is configured to execute a plurality of applications that perform the respective functionalities of performing a call and a subsequent call according to the exemplary embodiments. The UE 110 may represent any electronic device that is configured to perform wireless functionalities. Specifically, the UE 110 may perform a VoLTE call when connected to the LTE-RAN 122. The UE 110 may be a portable device such as a smartphone, a tablet, a phablet, a laptop, a wearable, etc. In another example, the UE 110 may be a client stationary device such as a desktop terminal. The UE 110 may be configured to perform cellular functionalities such as LTE related or circuit switched. The UE 110 may include a processor 605, a memory arrangement 610, a display device 615, an input/output (I/O) device 620, a transceiver 625, and other components 630. The other components 630 may include, for example, an audio input device, an audio output device, a battery, a data acquisition device, ports to electrically connect the UE 110 to other electronic devices, etc.

The processor 605 may be configured to execute a plurality of applications of the UE 110. For example, the applications may include a web browser when connected to a communication network via the transceiver 625. As such, when connected to the LTE-RAN 122, the data for the web browser may utilize the default bearer. In another example, the processor 605 may execute a VoLTE call application 635 that enables the UE 110 to perform a VoLTE call functionality such as with the UE 112. The VoLTE call application 635 may further be configured to perform the VoLTE call setup procedure such as performing the operations described above. In yet another example, the processor 605 may execute a handover trigger application 640. As will be described in further detail below, the handover trigger application 640 may utilize an operation that causes the LTE-RAN 122 to handover the association of the UE 110 from the currently associated eNB 205 to one of the neighboring eNBs 210-220. In a further example, the processor 605 may execute a failover trigger application 645. As will be described in further detail below, the failover trigger application 645 may utilize an operation that causes the LTE-RAN 122 to switch to a circuit switched connectivity with the UE 110.

It should be noted that the above noted applications each being an application (e.g., a program) executed by the processor 605 is only exemplary. The functionality associated with the applications may also be represented as a separate incorporated component of the UE 110 or may be a modular component coupled to the UE 110, e.g., an integrated circuit with or without firmware.

The memory 610 may be a hardware component configured to store data related to operations performed by the UE 110. Specifically, the memory 610 may store data related to the various applications 635-645. For example, the VoLTE call application 635 may utilize a phone book functionality that stores contact information for other users and UEs. The display device 615 may be a hardware component configured to show data to a user while the I/O device 620 may be a hardware component that enables the user to enter inputs. It should be noted that the display device 615 and the I/O device 620 may be separate components or integrated together such as a touchscreen.

The transceiver 625 may be a hardware component configured to transmit and/or receive data. That is, the transceiver 625 may enable communication with other electronic devices directly or indirectly through a network based upon an operating frequency of the network. The transceiver 625 may operate on a variety of different frequencies or channels (e.g., set of consecutive frequencies) that are related to the VoLTE call functionality. Thus, an antenna (not shown) coupled with the transceiver 625 may enable the transceiver 625 to operate on the LTE frequency band.

The first UE operation according to the exemplary embodiments may determine whether a subsequent call is to be performed as a VoLTE call based upon whether a handover has successfully occurred. As discussed above, the dedicated bearer is required for the VoLTE call to be performed. Also as discussed above, a trigger to perform the first UE operation is based upon receiving the SIP 200 OK signal indicating that the MT UE 112 has accepted the VoLTE call and receiving the SIP 503 signal indicating that the eNB 205 does not have sufficient resources to establish the dedicated bearer for the MO UE 110. Thus, the MO UE 110 may utilize the handover trigger application 640 for a substantially similar reason as the network operation utilizing the handover application 330 since the eNB 205 is congested.

The MO UE 110 may perform the setup procedure for a first VoLTE call using the VoLTE call application 635 including the SIP signaling associated therewith such as the SIP Invite and the SIP 200 OK. The MO UE 110 may subsequently receive a SIP 503 from the eNB 205 that results in the first VoLTE call failing. The MO UE 110 may be configured with settings as to when to perform the subsequent operations. In a first example, MO UE 110 may perform the first UE mechanism whenever the SIP 503 is received. In a second example, the MO UE 110 may perform the first UE mechanism after the SIP 503 is received and when a second VoLTE call is attempted to be performed within a predetermined time period.

When the subsequent operations are determined to be performed, the MO UE 110 may generate an A3 event measurement report. Those skilled in the art will understand that event measurement reports for A1-A5 may be utilized for a variety of reasons and to report various events. For example, the A3 event measurement report may indicate that a neighbor eNB becomes better than a serving eNB such as the neighboring eNB 210 is better over the currently associated eNB 205. In another example, an A2 event measurement report may indicate that a serving eNB becomes worse than a threshold such as the currently associated eNB 205 having network parameters or qualities falling under a predetermined threshold (e.g., RSSI). In this manner, using the handover trigger application 640, the MO UE 110 may generate the A3 event measurement report indicating that the eNB 210 provides an improved connection over the eNB 205 to the LTE-RAN 122. It is noted that the handover trigger application 640 may receive information that the eNB 205 in actuality has the better connection. However, to trigger the handover, the handover trigger application 640 may report otherwise. The LTE-RAN 122 may receive the A3 event measurement report and cause the eNBs 205 and 210 to perform a handover process such that the UE 110 associates and connects from the eNB 205 to the eNB 210. The MO UE 110 may subsequently receive an indication of the handover. Accordingly, a second VoLTE call that is performed may be done with the eNB 210 which may have available resources to provide the dedicated bearer.

The handover trigger application 640 may perform the above-described operations based upon an attempt threshold. For example, the A3 event measurement report may be transmitted at least a number of times less than the attempt threshold value to trigger the handover. Thus, if the MO UE 110 receives the handover indication prior to transmitting the A3 event measurement report a predetermined number of times, the MO UE 110 may now utilize the newly associated eNB. However, if the MO UE 110 does not receive the handover indication even after the A3 event measurement report has been transmitted the predetermined number of times, the MO UE 110 may perform yet further operations to prepare the connection for the call. Specifically, the MO UE 110 may utilize the failover trigger application 645. The failover trigger application 645 may receive an indication from the handover trigger application 640 that the number of attempts has been performed at least the predetermined number of times. For example, the neighboring eNBs 210-220 may be unavailable (e.g., at capacity) for a handover. In another example, the LTE-RAN 122 may deny or ignore the request for the handover based upon the A3 event measurement report. The failover trigger application 645 may accordingly utilize a substantially similar mechanism as the handover trigger application 640 by transmitting the A2 event measurement report. As noted above, the A2 event measurement report may indicate that the currently associated eNB 205 is no longer providing a minimum threshold connection. Again, the eNB 205 may in actuality have a sufficient connection but still use the A2 event measurement report to be transmitted to the LTE-RAN 122. Accordingly, the LTE-RAN 122 may cause the eNB 205 to switch to a circuit switched connectivity for the MO UE 110. Therefore, a further attempt at a call may be performed over the circuit switched connection. The failover trigger application 645 may initially perform further operations such as determining a circuit switched capability (e.g., WCDMA measurements) to verify whether this option is available. If the UE 110 has the circuit switched capability, then the failover trigger application 645 may perform the above operations. However, if the UE 110 does not have the circuit switched capability, the failover trigger application 645 may continue to transmit the A3 event measurement report in the hopes of a handover or may continue with the connection to the currently associated eNB 205.

Figure 7:
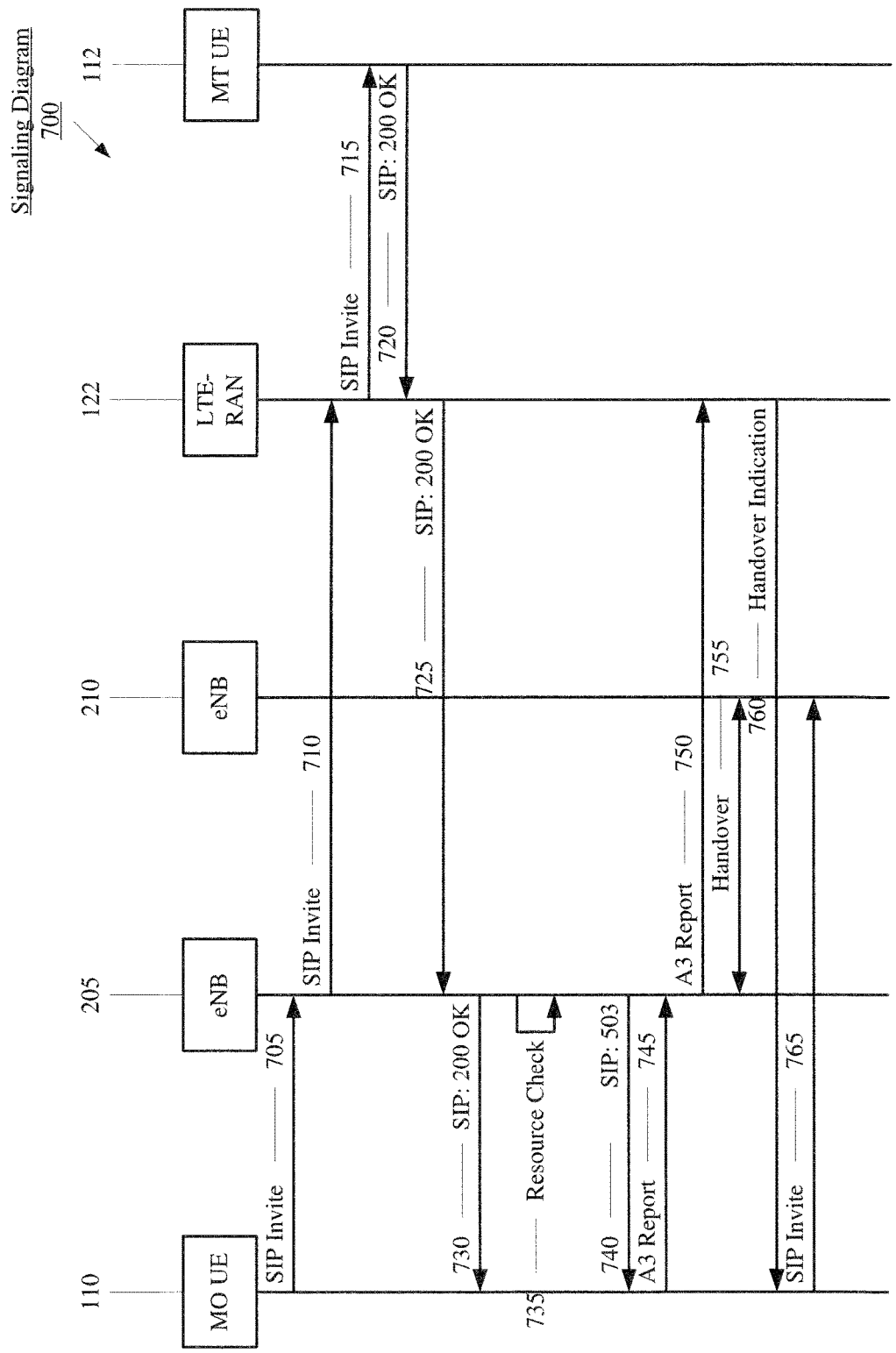
FIG. 7 shows a first signaling diagram for a user equipment operation in performing a call according to various embodiments described herein.

FIG. 7 shows a first signaling diagram 700 for a UE operation in performing a call according to various embodiments described herein. The signaling diagram 700 illustrates an exemplary process in which the handover trigger application 640 is being used. Thus, the signaling diagram 700 may begin with a conventional process in performing a VoLTE call. The signaling diagram 700 may assume that the UE 110 is the MO UE while the UE 112 is the MT UE, the MO UE 110 is currently connected to the eNB 205, and the eNB 210 is a neighboring eNB to the eNB 205 and capable of communicating with the MO UE 110.

In performing the setup for the VoLTE call, the MO UE 110 may transmit a SIP invite 705 to the eNB 205. The eNB 205 may forward the SIP invite 710 to the LTE-RAN 122. The LTE-RAN 122 may forward the SIP invite 715 to the target destination of the MT UE 112. The MT UE 112 may respond and accept the invite for the VoLTE call. Accordingly, the MT UE 112 may transmit a SIP 200 OK signal 720 back to the LTE-RAN 122. The LTE-RAN 122 may forward the SIP 200 OK 725 to the eNB 205. The eNB 205 may forward the SIP 200 OK 730 to the MO UE 110. The eNB 205 may perform a resource check 735 to determine whether there are sufficient resources to provide the dedicated bearer. If there are insufficient resources (e.g., the dedicated bearer cannot be established), the eNB 205 may transmit a SIP 503 740 to the MO UE 110.

As discussed above, the MO UE 110 may perform subsequent operations upon receiving the SIP 200 OK and the SIP 503. The first signaling diagram 700 may also relate to performing the subsequent operations upon receiving the SIP 503. As described above, the receipt of the SIP 200 OK followed by the SIP 503 indicates to the MO UE 110 that the currently connected eNB 205 cannot set up the dedicated bearer. Thus, the MO UE 110 may transmit the A3 event measurement report 745 where the A3 event measurement report 745 indicates that the eNB 210 provides a better connection than the eNB 205. The eNB 205 may forward the A3 event measurement report 750 to the LTE-RAN 122. The LTE-RAN 122 may cause a handover procedure 760 such that the MO UE 110 is associated and connected to the eNB 210. The LTE-RAN 122 may transmit a handover indication 760 regarding a successfully performed handover from the eNB 205 to the eNB 210. The MO UE 110 may update its connectivity information such that a further VoLTE call may be attempted where a further SIP invite 765 is transmitted to the eNB 210 and the VoLTE call will be attempted with the UE 110 being attached to the eNB 210.

Figure 8:
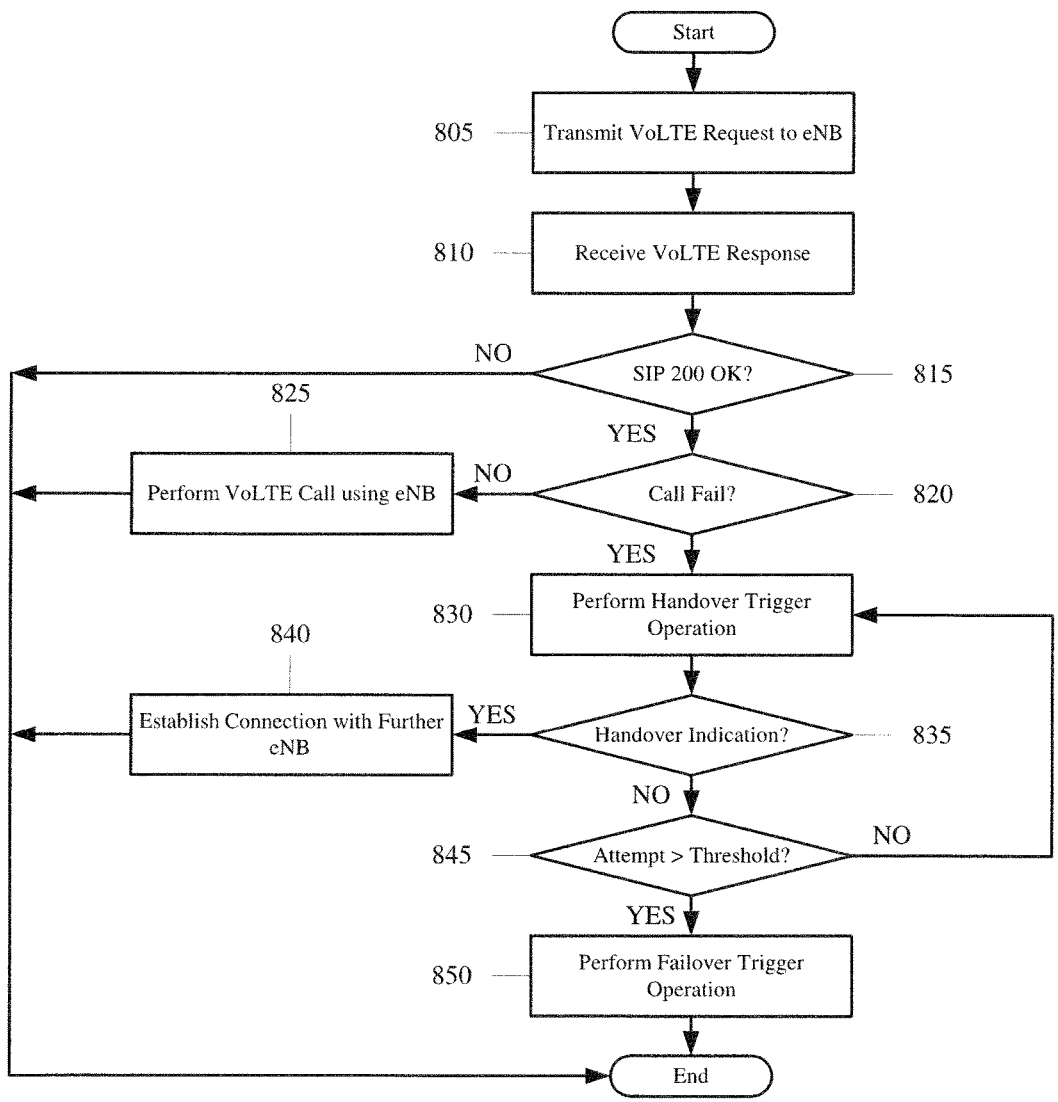
FIG. 8 shows a first method for a user equipment operation in performing a call according to various embodiments described herein.

FIG. 8 shows a first method 800 for a UE operation in performing a call according to various embodiments described herein. The method 800 relates to the second mechanism according to the exemplary embodiments of a UE operation aiding the call to be performed initially as a VoLTE call and, if necessary, as a circuit switched call. In particular, the method 800 relates to the first UE operation of the second mechanism. The method 800 will be described with reference to the UE 110. The method 800 will also be described with regard to the network arrangement 100 of FIG. 1, the LTE-RAN 122 of FIG. 2, and the UE 110 of FIG. 6.

In 805, the MO UE 110 transmits a VoLTE request to the currently associated eNB 205. Specifically, a SIP Invite may be transmitted including the target destination. In 810, the MO UE 110 may receive a VoLTE response from the MT UE 112. Specifically, the VoLTE response may be a SIP 200 OK indicating that the user of the MT UE 112 has accepted the invite. The VoLTE response may also correspond to a reject indication.

In 815, the MO UE 110 determines whether the VoLTE response is a SIP 200 OK signal. If the MO UE 110 determines that the invite is rejected, the MO UE 110 may end the method 800. However, if the MO UE 110 determines that the SIP 200 OK is received, the MO UE 110 continues the method 800 to 820. In 820, the MO UE 110 determines whether the VoLTE call fails. Specifically, the MO UE 110 determines whether a SIP 503 is received from the currently associated eNB 205 indicating that there are insufficient resources for the dedicated bearer to be used in the VoLTE call. If the call has not failed (a SIP 503 is not received and the MO UE 110 is connected to the MT UE 110 over a VoLTE call), the MO UE 110 continues the method 800 to 825 where the VoLTE call is performed using the currently associated eNB 205. However, if the call does fail (a SIP 503 is received), the MO UE 110 continues the method 800 to 830.

In 830, the MO UE 110 performs a handover trigger operation. As discussed above, the handover trigger operation relates to the handover trigger application 640 generating an A3 event measurement report indicating that one of the neighboring eNBs such as the eNB 210 has a better connection than the currently associated eNB 205. Again, it is noted that this may not be true in actuality but used for purposes of this feature. The transmission of the A3 event measurement report to the LTE-RAN 122 may therefore cause the LTE-RAN 122 to perform a handover procedure. In 835, the MO UE 110 determines whether an indication is received confirming the handover has been performed. If the MO UE 110 determines that the handover indication has been received, the MO UE 110 continues the method 800 to 840. In 840, the MO UE 110 establishes a connection with the further eNB to which the handover procedure is performed.

If the MO UE 110 determines that the handover indication has not been received (e.g., within a time period following the transmission of the A3 event measurement report), the MO UE 110 continues the method 800 to 845. In 845, the MO UE 110 determines a number of attempts of performing the handover trigger operation. If the number of attempts is within a predetermined threshold, the MO UE 110 returns the method 800 to 830 where another attempt is performed. However, if the number of attempts is beyond the predetermined threshold, the MO UE 110 continues the method 800 to 850. In 850, the MO UE 110 performs a failover trigger operation. As discussed above, the failover trigger operation relates to the failover trigger application 645 generating an A2 event measurement report indicating that the currently associated eNB 205 does not provide a sufficient connection (based upon a connection threshold). Again, it is noted that this may not be true in actuality but used for purposes of this feature. The transmission of the A2 event measurement report to the LTE-RAN 122 may therefore cause the LTE-RAN 122 to change the connection to a circuit switched connectivity. Of course, this operation assumes that the UE 110 has a circuit switched capability and a possible connection to a circuit switched network, e.g., a legacy RAN 120 is available for connection.

As discussed above, the first UE operation of the second mechanism may be used to increase a probability of a following call to be successful through a handover procedure or failover procedure being performed. Thus, a current VoLTE call resulting in a failure may trigger the first UE operation to be used. A second UE operation in the second mechanism may utilize an abbreviated version of the first UE operation. However, the second UE operation may be used to minimize an effort of the user as well as hide a call failure that may result. The MO UE 110 used in the second UE operation may include substantially similar components and perform substantially similar operations as the MO UE 110 of the first UE operation. However, the processor 605 may not execute a handover trigger application 640.

The second UE operation according to the exemplary embodiments may determine whether a current call is to be attempted again after a set of operations are performed based upon whether the attempt for a VoLTE call has succeeded. It is again noted that a trigger to perform the second UE operation is upon receiving the SIP 200 OK signal indicating that the MT UE 112 has accepted the VoLTE call and receiving the SIP 503 signal indicating that the eNB 205 does not sufficient resources to establish the dedicated bearer for the MO UE 110. Thus, the MO UE 110 may utilize the failover trigger application 645.

In contrast to the first UE operation, the MO UE 110 may immediately utilize the failover trigger application 645 without attempting a handover procedure. Accordingly, the A2 event measurement report may be transmitted to the LTE-RAN 122 to change the connection to a circuit switched connectivity. The second UE operation may also utilize an auto-redial feature that does not require any user intervention. For example, if the second UE operation is a user selected feature, the user of the MO UE 110 may attempt to perform a VoLTE call with the MT UE 112. However, the failure of the VoLTE call (e.g., receiving the SIP 503) may trigger the failover trigger application 640 to be used. Upon setting the connection to the circuit switched connectivity, the failover trigger application 645 may automatically perform an auto-redial operation with the MT UE 112 using the circuit switched connectivity. In this manner, this set of calls may appear as a single call to the user.

Figure 9:
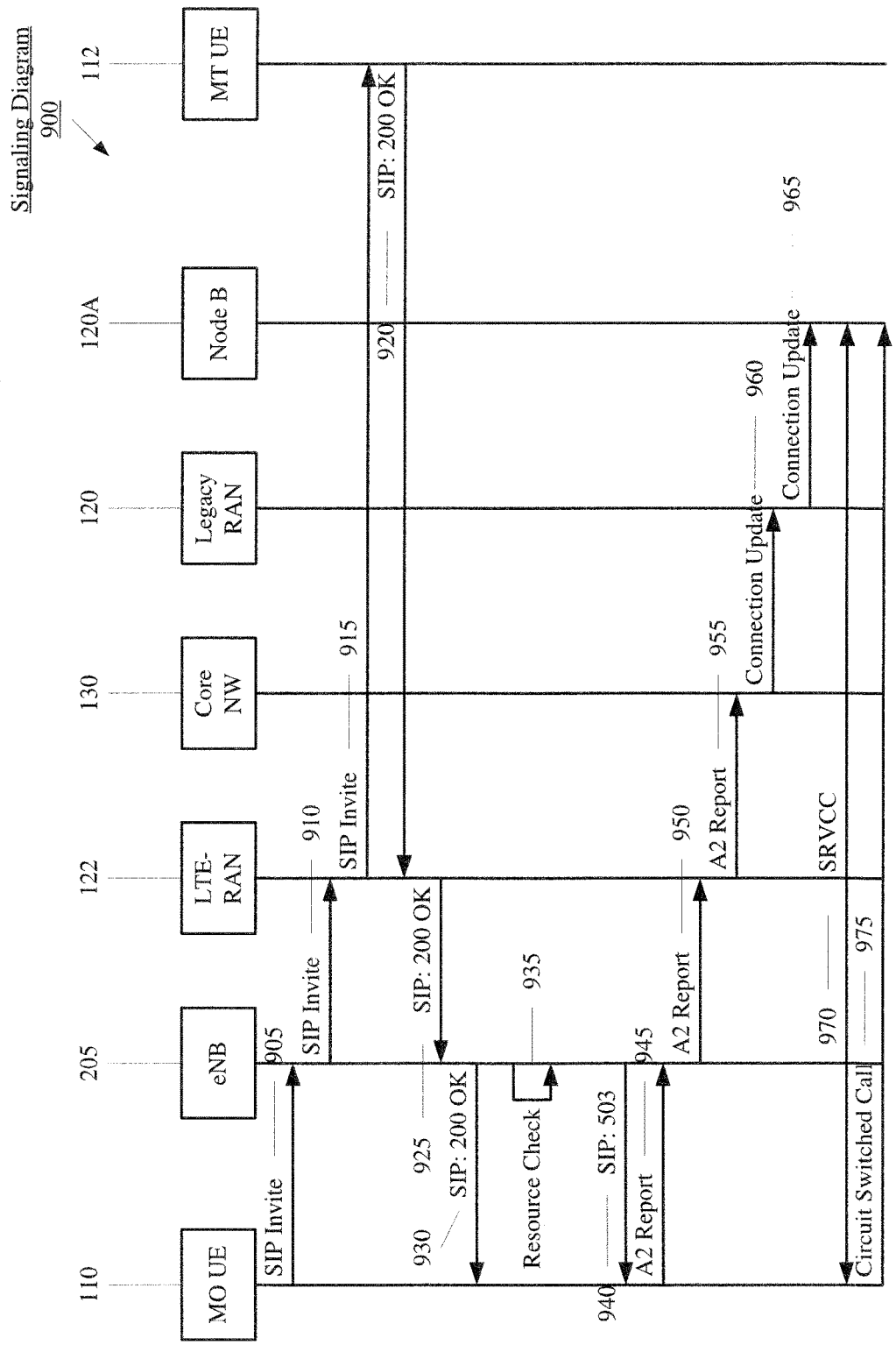
FIG. 9 shows a second signaling diagram for a user equipment operation in performing a call according to various embodiments described herein.

FIG. 9 shows a second signaling diagram 900 for a UE operation in performing a call according to various embodiments described herein. The signaling diagram 900 illustrates an exemplary process in which the failover trigger application 645 is being used with an auto-redial feature. Thus, the signaling diagram 900 may begin with a conventional process in performing a VoLTE call. The signaling diagram 900 may assume that the UE 110 is the MO UE while the UE 112 is the MT UE and the MO UE 110 is currently connected to the eNB 205.

In performing the setup for the VoLTE call, the MO UE 110 may transmit a SIP invite 905 to the eNB 205. The eNB 205 may forward the SIP invite 910 to the LTE-RAN 122. The LTE-RAN 122 may forward the SIP invite 915 to the target destination of the MT UE 112. The MT UE 112 may respond and accept the invite for the VoLTE call. Accordingly, the MT UE 112 may transmit a SIP 200 OK signal 920 back to the LTE-RAN 122. The LTE-RAN 122 may forward the SIP 200 OK 925 to the eNB 205. The eNB 205 may forward the SIP 200 OK 930 to the MO UE 110. The eNB 205 may perform a resource check 935 to determine that there are insufficient resources to provide the dedicated bearer. Thus, the eNB 205 may transmit a SIP 503 940 to the MO UE 110.

As discussed above, the MO UE 110 may perform subsequent operations upon receiving the SIP 200 OK and the SIP 503. The second signaling diagram 900 may also relate to performing the subsequent operations upon receiving the SIP 503. Thus, the MO UE 110 may transmit the A2 event measurement report 945 where the A2 event measurement report 945 indicates that the eNB 205 provides an insufficient connection. The eNB 205 may forward the A2 event measurement report 950 to the LTE-RAN 122, which then subsequently forwards the A2 report 955 to the core network 130. The core network 130 may cause a connection change such that the MO UE 110 is changed to a circuit switched connectivity by sending a connection update 960 to the legacy RAN 120 (e.g., the circuit switched network). The legacy RAN 120 may forward the connection update 965 to a base station (e.g., Node B 120A) of the legacy RAN 120 to which the UE 110 may attach. This may cause the UE 110 and the Node B 120A to crate an SRVCC connection 970 that may be used for a circuit switched call. The MO UE 110 may then re-attempt the call 975 using the SRVCC connection 970.

Figure 10:
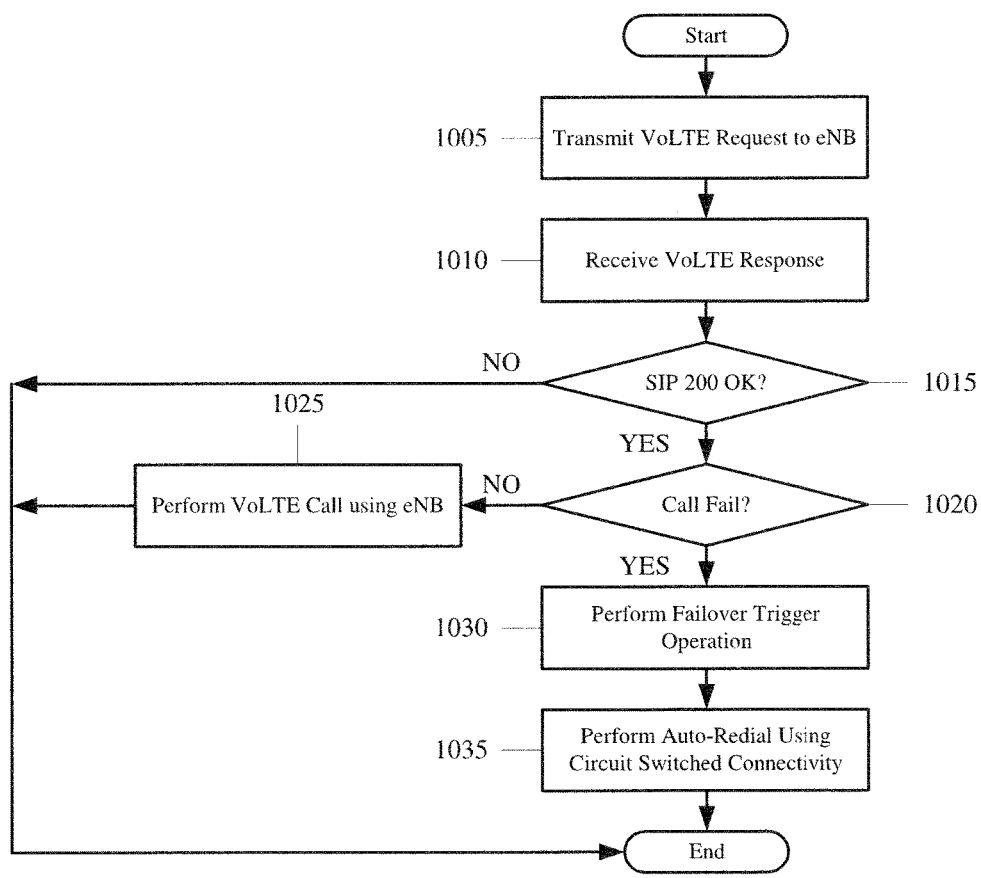
FIG. 10 shows a second method for a user equipment operation in performing a call according to various embodiments described herein.

FIG. 10 shows a second method 1000 for a UE operation in performing a call according to various embodiments described herein. The method 1000 relates to the second mechanism according to the exemplary embodiments of a UE operation aiding the call to be performed initially as a VoLTE call and performing a circuit switched call if the VoLTE call fails. In particular, the method 1000 relates to the second UE operation of the second mechanism. The method 1000 will be described with reference to the UE 110. The method 1000 will also be described with regard to the network arrangement 100 of FIG. 1, the LTE-RAN 122 of FIG. 2, and the UE 110 of FIG. 6.

In 1005, the MO UE 110 transmits a VoLTE request to the eNB 205. Specifically, a SIP Invite may be transmitted including the target destination. In 1010, the MO UE 110 may receive a VoLTE response from the MT UE 112. Specifically, the VoLTE response may be a SIP 200 OK indicating that the user of the MT UE 112 has accepted the invite. The VoLTE response may also correspond to a reject indication.

In 1015, the MO UE 110 determines whether the VoLTE response is a SIP 200 OK signal. If the MO UE 110 determines that the invite is rejected, the MO UE 110 may end the method 1000. However, if the MO UE 110 determines that the SIP 200 OK is received, the MO UE 110 continues the method 1000 to 1020. In 1020, the MO UE 110 determines whether the VoLTE call fails. Specifically, the MO UE 110 determines whether a SIP 503 is received from the eNB 205 indicating that there are insufficient resources for the dedicated bearer to be used in the VoLTE call. If the call has not failed (a SIP 503 is not received and the MO UE 110 is connected to the MT UE 110 over a VoLTE call), the MO UE 110 continues the method 1000 to 1025 where the VoLTE call is performed using the eNB 205 that provides a dedicated bearer. However, if the call does fail (a SIP 503 is received), the MO UE 110 continues the method 1000 to 1030.

In 1030, the MO UE 110 performs a failover trigger operation. As discussed above, the failover trigger operation relates to the failover trigger application 645 generating an A2 event measurement report indicating that the eNB 205 is providing an insufficient connection. Again, it is noted that this may not be true in actuality but used for purposes of this feature. The transmission of the A2 event measurement report to the LTE-RAN 122 and to the cellular core network 130 causing a failover procedure where an SRVCC connection is setup with the legacy RAN 120 to change the voice connection to a circuit switched connectivity. Subsequently, in 1035, the MO UE 110 may perform an auto-redial using the circuit switched connectivity.

It is noted that the MO UE 110 may utilize various graphics shown on the display device 615 to indicate to the user of the various changes occurring. For example, the MO UE 110 may utilize the LTE-RAN 122 to perform the VoLTE call but may also be utilizing the LTE-RAN 122 to perform data related operations (e.g., web browser). However, a failure of the VoLTE call may cause the handover which may update the connection. This may prompt a graphic to be shown to the user of the change in connection (which may be less efficient). The failure of the VoLTE call may also cause the circuit switched connectivity to be used which may affect the data connection. This may prompt a graphic to be shown to the user of the change in connection. In another example, the failure of the VoLTE call and an automatic re-dial over the circuit switched connectivity may prompt a graphic to be shown to indicate the status of the call no longer being a VoLTE call.

The exemplary embodiments provide a device, system, and method of performing a call. In a first mechanism, a network operation may be used to preserve a call and attempt to connect the MO UE to the MT UE using a variety of operations. Specifically, when a VoLTE call is attempted but fails due to a dedicated bearer being unavailable, the network may perform a handover procedure to a neighboring base station, which may have resources to provide the dedicated bearer. In a second mechanism, a UE operation may be used to prepare a connection for a further attempt to connect the MO UE to the MT UE. Specifically, when a VoLTE call is attempted but fails due to a dedicated bearer being unavailable, in a first UE operation, the UE may perform a handover trigger procedure to associate with a neighboring base station that may provide the dedicated bearer. In a second UE operation, the UE may perform a failover trigger procedure to utilize a circuit switched connectivity for a subsequent call attempt to be performed.

It is noted that the above exemplary embodiments relate to operations performed by the UE and eNB. However, this is only exemplary. The exemplary embodiments may also be performed by a separate component or device that performs the above operations that affects the UE and/or the eNB. For example, a different LTE network component may perform the operations of the first mechanism and generates commands for the eNBs.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
    at a user equipment (UE) configured to establish a connection with a Long Term Evolution (LTE) network, the LTE network including a first evolved Node B (eNB) and a second eNB, the UE being associated with the first eNB:
    transmitting an invite signal to a further UE for a Voice over LTE (VoLTE) call;
    receiving an accept signal from the further UE for the VoLTE call;
    receiving a fail signal from the first eNB that a dedicated bearer is unavailable;
    generating a trigger signal in response to receiving the fail signal; and
    transmitting the trigger signal to the first eNB.

2. The method of claim 1, wherein the trigger signal is one of an A2 event measurement report or an A3 event measurement report.

3. The method of claim 1, wherein the trigger signal causes a handover procedure to be performed, wherein a successful completion of the handover procedure results in the UE being associated with the second eNB.

4. The method of claim 3, further comprising:
    determining whether the handover procedure is successful; and
    when the handover procedure is not successful, generating a second trigger signal; and
    transmitting the second trigger signal to the first eNB.

5. The method of claim 3, further comprising:
    determining whether the handover procedure is successful; and
    when the handover procedure is not successful, determining a number of trigger signals that have been transmitted to the first eNB in response to receiving the fail signal; and
    determining whether the number exceeds a threshold.

6. The method of claim 5, further comprising:
    when the number exceeds the threshold, generating a further trigger signal; and
    transmitting the further trigger signal to the first eNB, wherein the further trigger signal causes the UE to connect to a circuit switched network for voice calls.

7. The method of claim 5, further comprising:
    when the number does not exceed the threshold, generating a further trigger signal; and
    transmitting the further trigger signal to the first eNB, wherein the further trigger signal causes the handover procedure to be performed.

8. The method of claim 1, wherein the trigger signal causes the UE to connect to a circuit switched network for voice calls.

9. The method of claim 8, further comprising:
    performing an automatic redial corresponding to the invite signal using a circuit switched call.

10. A user equipment (UE), comprising:
    a transceiver configured to establish a connection with a Long Term Evolution (LTE) network, the LTE network including a first evolved Node B (eNB) and a second eNB, the UE being associated with the first eNB; and
    a processor configured to perform operations, comprising:
    generating an invite signal to be transmitted to a further UE for a Voice over LTE (VoLTE) call;
    receiving an accept signal from the further UE for the VoLTE call;
    receiving a fail signal from the first eNB that a dedicated bearer is unavailable; and
    generating a trigger signal in response to receiving the fail signal.

11. The UE of claim 10, wherein the trigger signal is an A3 measurement report that causes a handover procedure to be performed, wherein a successful completion of the handover procedure results in the UE being associated with the second eNB.

12. The UE of claim 11, wherein the processor is configured to perform further operations comprising:
   determining whether the handover procedure is successful; and
   when the handover procedure is not successful, generating a second trigger signal.

13. The UE of claim 11, wherein the processor is configured to perform further operations comprising:
   determining whether the handover procedure is successful; and
   when the handover procedure is not successful, determining a number of trigger signals that have been transmitted to the first eNB in response to receiving the fail signal; and
   determining whether the number exceeds a threshold.

14. The UE of claim 13, wherein the processor is configured to perform further operations comprising:
   when the number exceeds the threshold, generating a further trigger signal, wherein the further trigger signal causes the UE to connect to a circuit switched network for voice calls.

15. The UE of claim 13, wherein the processor is configured to perform further operations comprising:
   when the number does not exceed the threshold, generating a further trigger signal, wherein the further trigger signal causes the handover procedure to be performed.

16. The UE of claim 10, wherein the trigger signal causes the UE to connect to a circuit switched network for voice calls.

17. The UE of claim 16, wherein the processor is configured to perform further operations comprising:
   performing an automatic redial corresponding to the invite signal using a circuit switched call.

18. A method, comprising:
at an evolved Node B (eNB) of a Long Term Evolution (LTE) network:
   receiving a Voice over LTE (VoLTE) call request from a user equipment (UE) to place a VoLTE call to a further UE;
   determining whether the eNB has sufficient resources to provide a dedicated bearer to the UE for the VoLTE call;
   when it is determined the eNB has insufficient resources to provide the dedicated bearer,
      determining whether a further eNB of the LTE network has sufficient resources to provide the dedicated bearer for the UE, and
      determining whether the UE is capable of connecting to the further eNB; and
   when the further eNB has sufficient resources and the UE is capable of connecting to the eNB, performing a handover procedure such that the UE is associated with the further eNB.

19. The method of claim 18, wherein the determining whether the eNB has sufficient resources is performed after receiving an indication that the further UE has accepted the VoLTE call.

20. The method of claim 18, wherein the determining whether the further eNB has sufficient resources includes:
   sending a request via an X2 interface connecting the eNB and the further eNB; and
   receiving a response from the further eNB via the X2 interface.

* * * * *